United States Patent [19]

Utter

[11] 4,007,525
[45] Feb. 15, 1977

[54] SPOOL FOR A VEGETATION CUTTING APPARATUS HAVING A FLEXIBLE LINE CUTTING ELEMENT

[76] Inventor: Gordon Francis Utter, 32019 E. I-10, Redlands, Calif. 92373

[22] Filed: Mar. 23, 1976

[21] Appl. No.: 669,499

[52] U.S. Cl. .................................... 30/276
[51] Int. Cl.² ................................... B26B 7/00
[58] Field of Search .......................... 30/276

[56] References Cited

UNITED STATES PATENTS

| 3,826,068 | 7/1974 | Ballas | 30/276 UX |
| 3,859,776 | 1/1975 | Ballas et al. | 30/276 UX |
| 3,892,037 | 7/1975 | Brown | 30/276 |
| 3,928,911 | 12/1975 | Pittinger | 30/276 |

FOREIGN PATENTS OR APPLICATIONS

| 1,281,450 | 12/1961 | France | 30/276 |

*Primary Examiner*—Al Lawrence Smith
*Assistant Examiner*—J. T. Zatarga
*Attorney, Agent, or Firm*—Cushman, Darby & Cushman

[57] ABSTRACT

A spool secured by adjustable fastening means within a rotatable member of a vegetation cutter is designed to facilitate adjustment in the length of a flexible line extending from the spool through an opening in the member. The spool includes a first flange having a plurality of projections thereon which engage the member in accordance with pressure applied by the fastening means to a second flange of the spool whereby the spool is selectively permitted to rotate with, or relative to, said member.

4 Claims, 3 Drawing Figures

SPOOL FOR A VEGETATION CUTTING APPARATUS HAVING A FLEXIBLE LINE CUTTING ELEMENT

BACKGROUND OF THE INVENTION

There is disclosed in U.S. Pat. Nos. 3,826,068 and 3,859,776 issued to George C. Ballas and Thomas N. Geist, apparatus for cutting vegetation. Such apparatus in general comprises a rotatable head from which extends at least one length of a flexible non-metallic line. This line is drawn from a spool removably housed within the head, and passes through an opening in the side of the head. On rotation of the head, the extending line engages and cuts the vegetation.

In order to most effectively perform its cutting function, the length of line extending from the housing should be of a prescribed length. During operation, the line is exposed to wear and damage. Consequently, it is necessary from time to time to draw additional line from the spool. With the arrangement disclosed in U.S. Pat. No. 3,859,776, the spool is locked with respect to the rotatable head. Therefore, in order to unwind line from the spool, it is necessary either to (1) detach the spool from the head, release the desired length of line and then re-secure the spool to the head; or (2) with the spool locked in place, grasp the free end of the line and pull additional line past the flange of the spool.

Obviously, complete removal of the spool is a substantial inconvenience, and in the case where additional line is drawn from the locked spool, and must pass through a particular opening in the side of the rotating head, the line has to be trimmed to obtain the correct length. It has been found that from 30 to 50% of the spooled line is wasted as a result of such trimming.

In the arrangement of U.S. Pat. No. 3,826,068, line length can be adjusted without removing the spool, but this involves complex mechanical structure wherein the line is dispensed in incremental lengths rather than by continuous removal which permits an exact amount of line to be withdrawn from the spool. Thus, such a known arrangement is expensive structurally and also is wasteful.

SUMMARY OF THE INVENTION

It is the principal object of the present invention to provide an improved, inexpensive spool which facilitates establishing the proper length of the vegetation cutting line in a device of the type disclosed in U.S. Pat. Nos. 3,826,068 and 3,859,776 without the inconvenience of removing the spool from the rotatable head and without wasting the line. This is accomplished by providing a spool design which can be rendered rotatable with respect to the head whereby an exact length of line can be drawn from the spool while the spool remains in situ within the rotating head.

Details of the improved spool hereinafter will be described with reference to the accompany drawings wherein.

DETAILS OF THE INVENTION

Figure 1:
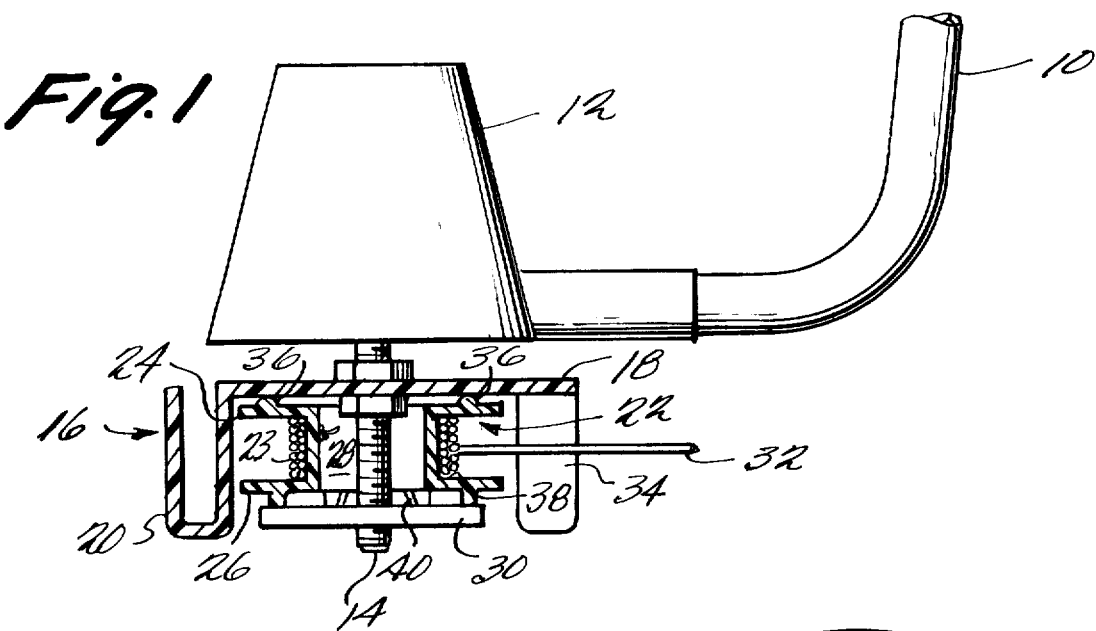
FIG. 1 is a side elevational view, partially in section, illustrating the prinicpal operational components of a vegetation cutting apparatus employing the present invention.

Referring to the drawings, FIG. 1 illustrates a handle 10 to the lower end of which a housing 12 is secured. The housing 12 contains a suitable drive device, such as an electric motor, for rotating a shaft 14. A rotatable member 16 is secured to the shaft 14 by conventional means so as to be rotated when the shaft is driven by the motor. Member 16 includes a substantially flat upper portion 18 and a downwardly extending edge portion 20 which together define a chamber within member 16 for receiving a spool 22. The spool comprises a central support portion 23 and flanges 24 and 26 at opposite ends thereof. The diameters of upper and lower flanges 24 and 26, respectively, of the spool are slightly less than that of the chamber within member 16. The drive shaft 14 projects through aperture 28 in the central support portion 23 of the spool, and adjustable securing means, comprising a nut 30 having a diameter greater than that of aperture 28, is joined to shaft 14 to retain the spool 22 within the chamber.

A flexible non-metallic line 32, preferably a synthetic such as nylon, is wound on spool 22. The free end of line 32 extends through an opening 34 in the edge portion 20 which comprises the side of rotatable member 16. During rotation of drive shaft 14, the spool 22 rotates the member 16 causing the line extending beyond edge portion 20 to project outwardly and to be propelled against the vegetation thereby cutting same.

Figure 2:
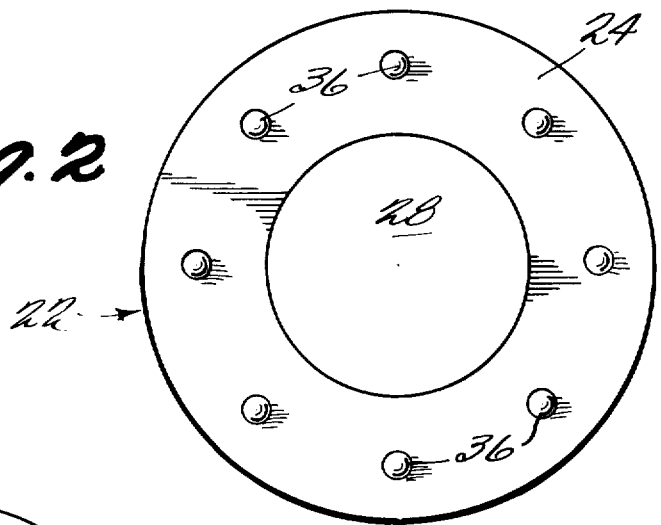
FIG. 2 is a top plan view of the spool shown in FIG. 1.
Figure 3:
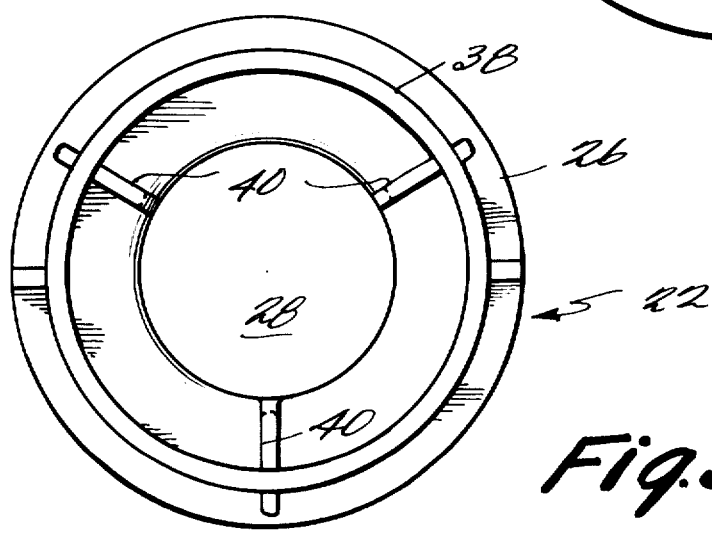
FIG. 3 is a bottom plan view of the spool shown in FIG. 1.

The manner by which the length of line 32 can be adjusted can be appreciated by considering FIG. 1 together with the spool construction details now to be described with respect to FIGS. 2 and 3.

The upper flange 24 of spool 22 (FIG. 2) is provided with a plurality of projections 36 radially arranged with respect to the axis of the aperture 28 through the spool. These projections engage the underside of the upper portion 18 of the rotatable member 16 and prevent relative rotation between member 16 and the spool 22 on drive shaft 14 when nut 30 is tightened firmly on drive shaft 14. When nut 30 so engages the shaft, it is seated securely on a ring 38 (FIG. 3) which is concentric with the axis of aperture 28 and which is integral with and projects from lower flange 26 of spool 22. Thus, pressure on the spool exerted by nut 30 is evenly distributed over the spool to force projections 36 on flange 24 firmly against the rotatable member 16. Additional projections 40 (FIG. 3) arranged integrally with ring 38 at 120° intervals about flange 26 of the spool serve to support ring 38. Projections 40 also are engaged by nut 30.

When it is necessary to adjust the length of line 32, all that is required with the arrangement just described is to loosen nut 30 to relieve the pressure of the projections 36 against the rotatable member 16 by an amount sufficient to permit relative rotation of spool 22 with respect to member 16. The free end of line 32 thereafter is merely pulled through the opening 34 in member 16 until the desired length of additional line is drawn from the spool. This length is conveniently determined by an appropriate marking on housing 12. The nut 30 then is tightened, and the cutting apparatus is ready for operation.

Utilizing the arrangement just described to adjust the length of line 32, it is unnecessary to remove the spool 22 from the chamber within member 16. Additionally, there is no waste as the line 32 can be drawn from spool 22 to precisely the correct length.

What is claimed is:

1. An improved spool for a vegetation cutting apparatus of the type having a drive shaft, a rotatable member for housing said spool, a flexible line extending from the spool through an opening in said member, and adjustable securing means joined to said shaft for retaining the spool within said member, said spool comprising:
   a central support portion having an aperture therein for receiving said drive shaft;
   a first flange located at one end of said support portion;
   a plurality of spaced projections located on an outer surface of said flange;
   a second flange located at the opposite end of said support portion and adapted to be engaged by said securing means to cause the projections to engage said rotatable member whereby the spool is selectively joined with said member in rotatable relationship.

2. A spool as set forth in claim 1, wherein said projections are radially oriented on said first flange with respect to the axis of said aperture.

3. A spool as set forth in claim 2, wherein said second flange includes a ring integral with and projecting from an outer surface of said second flange, said ring being concentric with said axis and adapted to be engaged by said securing means.

4. A spool as set forth in claim 3, further comprising additional projections located on the outer surface of said second flange and radially oriented with respect to the axis of said aperture, said additional projections also being adapted to be engaged by said securing means.

* * * * *